US006868117B1

United States Patent
Mardinian

(10) Patent No.: US 6,868,117 B1
(45) Date of Patent: Mar. 15, 2005

(54) SPLITTER AND MICROFILTER DONGLE FOR A SINGLE RJ11 DSL/ANALOG COMBO MODEM

(75) Inventor: Olivier Mardinian, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 718 days.

(21) Appl. No.: 09/793,844

(22) Filed: Feb. 26, 2001

(51) Int. Cl.[7] .............................. H04B 1/38; H04L 5/16
(52) U.S. Cl. ..................... 375/222; 439/188; 379/22.06
(58) Field of Search ..................... 375/222; 379/93.05; 370/493

(56) References Cited

U.S. PATENT DOCUMENTS

| | | | | |
|---|---|---|---|---|
| 5,930,340 A | * | 7/1999 | Bell | 379/93.08 |
| 6,371,780 B1 | * | 4/2002 | Aponte et al. | 439/188 |
| 6,674,843 B1 | * | 1/2004 | Ham | 379/93.01 |
| 2001/0048716 A1 | * | 12/2001 | Gough et al. | 375/222 |
| 2002/0006137 A1 | * | 1/2002 | Rabenko et al. | 370/466 |
| 2002/0164003 A1 | * | 11/2002 | Chang et al. | 379/93.05 |
| 2003/0068033 A1 | * | 4/2003 | Kiko | 379/413 |
| 2003/0179818 A1 | * | 9/2003 | D'Angelo et al. | 375/222 |

\* cited by examiner

*Primary Examiner*—Stephen Chin
*Assistant Examiner*—Harry Vartanian
(74) *Attorney, Agent, or Firm*—Burns, Doane, Swecker & Mathis, L.L.P.

(57) ABSTRACT

A dongle for interfacing between a DSL/analog combo modem with a single RJ-11 jack and each of a DSL and analog phone outlets. The dongle in combination with the combo modem can be used in both DSL spluttered environments and DSL splitterless environments. The dongle includes a DSL microfilter, and a switch to turn the filter on and off. When the filter is off, the dongle acts as a wire router and DSL splittered signals received from a DSL outlet are passed to the DSL outer twisted pair of the dongle's RJ-11 combo jack. Analog splattered signals received from the analog outlet are passed to the analog inner twisted pair of the dongle's RJ-11 combo jack. When the filter is on, the DSL and analog signals are received on the same DSL twisted pair and are filtered by the filter so as to split out each of the DSL and analog signals. The filtered signals are then passed to each of the DSL outer twisted pair and to the analog Ainner twisted pair, respectively, of the dongle's modem RJ-11 combo jack.

13 Claims, 2 Drawing Sheets

SPLITTER AND MICROFILTER DONGLE FOR A SINGLE RJ11 DSL/ANALOG COMBO MODEM

BACKGROUND OF THE INVENTION

1. Field of the Invention

The present invention relates generally to telecommunications devices and more particularly to the use of modems in DSL and analog environments.

2. Background Information

Standard analog modems (modulator-demodulator devices) are currently commonplace in the home and office environments, where they are used to enable electronic devices, such as personal computers, to transmit data over existing telephone lines (made of small gauge copper wire) to other electronic devices. Data is stored digitally in such devices, but is converted by an analog modem to be transmitted over the lines in analog form. A data stream is established between a sender (i.e., originating electronic device) and a receiver (i.e., receiving electronic device) by using the resources of an entire telecommunications system. In other words, data is transmitted from the sender's local loop, through a telephone switching system, and to the receiver's local loop. Because the lines used by analog modems to transmit data only use a frequency range of about 0–3400 Hz, a data transmittance limit of about 56,000 bits-per-second (bps) exists for communication through the lines. An analog modem operating at this high end may, for example, be a modem operating under the ITU V.90 standard.

An emerging technology called Digital Subscriber Line (DSL) offers users data transmittance speeds much higher than those offered by standard modem systems. Unlike the switching systems associated with analog communications, modems that support DSL must be physically connected at one end of a telephone line (i.e., copper wire) to a phone company central office at the other end of the line, which is typically no longer than 18,000 feet. However, by using a much greater bandwidth (from 60 KHz to 1 MHz), DSL allows higher transfer rates, but is limited to 18,000 feet in reach. Currently, DSL modems are capable of transmitting data from around 8.128 Mbps to 512 Kbps (downstream) and 128 Kbps to 800 Kbps (upstream).

In addition, because DSL technology uses a different area of the spectrum than regular telephony, it is possible to have simultaneous voice and data use of a single copper connection. One example of communications technology that provides this is called Asymmetric DSL (ADSL). In other words, the "lower" range of frequencies (i.e., up to 3400 Hz) is used for the transmittance of voice data, while the "higher" range is used by a DSL modem to transmit digital data. In this way, a DSL connection is always "on" and separate from any voice data transmissions. However, many phones may pass onto the copper frequencies higher than 3400 kHz and allow voice data to interfere with a DSL data stream. Conversely, the higher frequencies used by a DSL modem may be picked up by a phone, which will cause static in the voice data stream.

Two methods currently exist for countering these problems. The first one creates a "splittered" environment, where devices called "splitters" are attached to phone lines in close proximity to the home or office where data is to be received. As shown in the FIG. 2 example, a mixed-signal S(1) is received by a splitter 205 from center 201, which may be, for example, a phone company central office. The mixed-signal S(1) includes both analog and DSL data and is spectrally separated by splitter 205 into analog signal S(2) and DSL signal S(3). Phone 202 receives analog signal S(2) through wall jack 206 and DSL modem 203 receives DSL signal S(3) through wall jack 207. Data from DSL signal S(3) is then processed and sent by DSL modem 203 to a processor 204, where information may be presented to a user (e.g., via an Internet browser). Splitter 205 also acts as a low pass filter, allowing only voice data frequencies (i.e., 0–3400 Hz) to be transmitted to and from the phone, thereby eliminating any interference between a phone and a DSL modem.

The second method creates a "splitterless" environment, where lower frequency data (i.e., analog voice) is not separated or "split" from the higher frequency data (i.e., digital DSL) before being received from a wall jack. As shown in the FIG. 3 example, center 301 transmits a mixed-signal S(4), which is received by microfilter 305 and DSL/analog combo modem 303 through wall jacks 306 and 307, respectively. In such an environment, the installation of a separate splitter (e.g., splitter 205 in FIG. 2) is avoided. Combo modem 303 is a modem which is capable of supporting both DSL and analog transmission and can also provide an internal splitting function. Thus, processor 304 is able to receive both digital data and converted analog data from combo modem 303. Microfilter 305 is a type of device currently used in splitterless environments to eliminate interference between voice and data frequencies. Such devices are essentially customer-installable low-pass filters connected between phones and wall jacks with the use of two RJ-11 (Registered Jack-11) jacks. In this example, phone 302 only receives data at a frequency of about 3400 Hz or lower, that is, data not filtered out by microfilter 305.

Currently available DSL/analog combo modems are equipped with two RJ-11 jacks for connection to outlets. In the interest of cost and space reduction, however, it would be preferable to have such a combo modem with only a single RJ-11 jack. An example of such a modem is described in co-pending U.S. patent application Ser. No. 09/792,946, the disclosure of which is hereby incorporated by reference in its entirety. In a splitterless environment, where both analog data and digital data frequencies are carried on a single line, a combo modem with only one RJ-11 jack is immediately useful. However, in a splittered environment, analog and digital frequencies arrive at separate wall jacks or outlets. When using a DSL/analog combo modem with one RJ-11 jack, a user is able to transmit and receive only one of the frequencies at a single time. In other words, a user with a one-jack combo modem connected to a wall jack receiving analog frequencies (i.e., voice) must disconnect the modem from the wall jack and connect it to a wall jack receiving digital frequencies (i.e., DSL) if the user desires to use the DSL capability of the modem.

SUMMARY OF THE INVENTION

The present invention is directed to a device which allows a single-jack DSL/analog combo modem to be simultaneously connected with an analog outlet and a DSL outlet in a spluttered environment.

According to a first embodiment of the present invention, a dongle is provided for interfacing a DSL/Analog combo modem equipped with a single jack with each of a DSL outlet and an analog phone outlet, the dongle comprising a combo jack having an inner pair of terminals and an outer pair of terminals, a DSL jack; and an analog jack, wherein the combo jack is coupled to the DSL jack and the analog jack simultaneously, and wherein the combo jack receives DSL signals at the outer pair of terminals and analog signals at the inner pair of terminals.

According to a second embodiment of the present invention, a system is provided for interfacing, comprising first connecting means for routing signals of a first type from a first jack to an outer pair of terminals of a third jack, second connecting means for routing signals of a second type from a second jack to an inner pair of terminals on the third jack, and third connecting means for routing signals of a mixed type from the first jack to a filtering means, wherein the filtering means separates the signals of a mixed type into signals of a first type and signals of a second type.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

Figure 1:
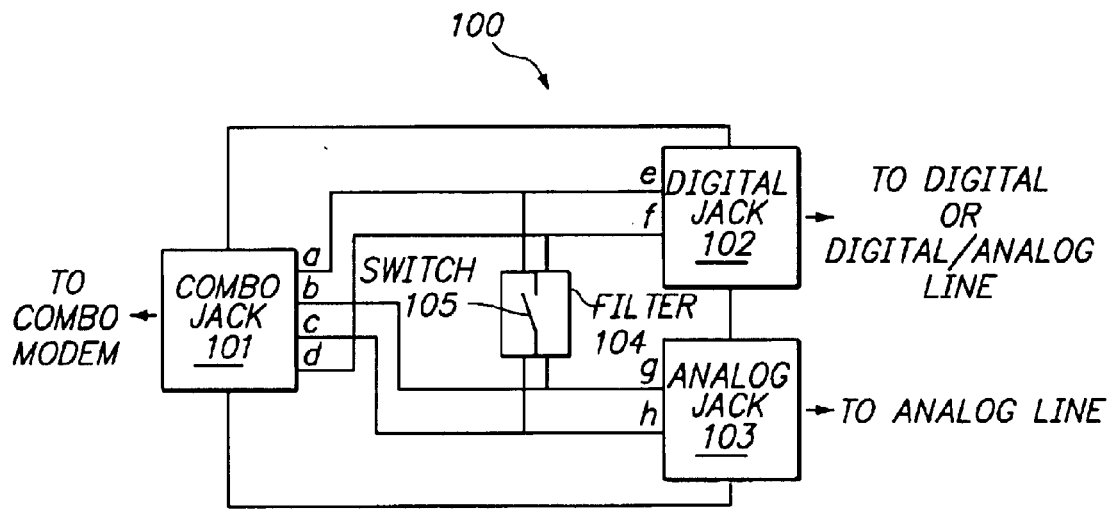
FIG. 1 illustrates a dongle in accordance with an embodiment of the present invention.
Figure 2:
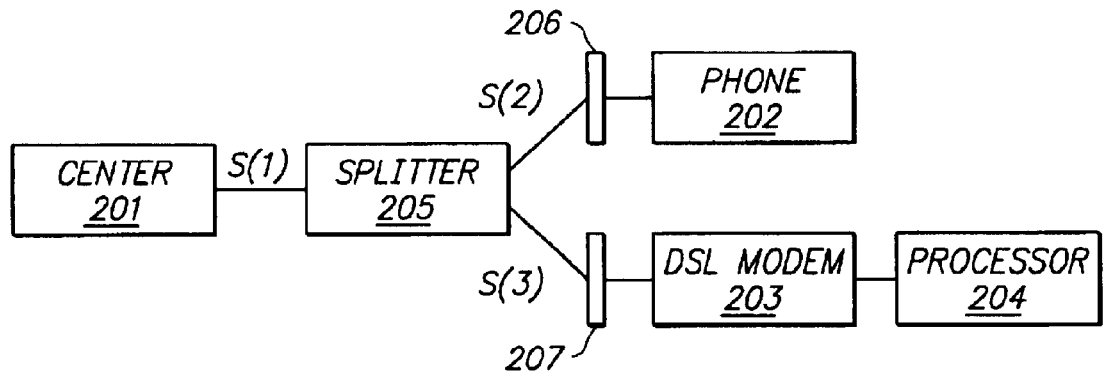
FIG. 2 illustrates a DSL/analog splittered environment.
Figure 3:
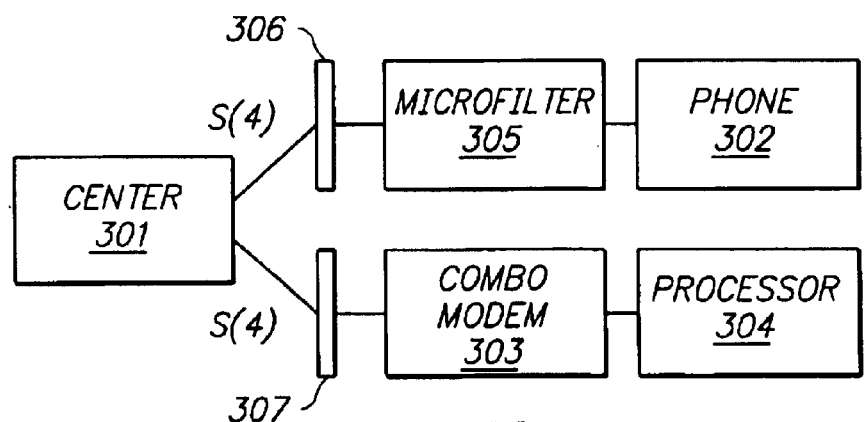
FIG. 3 illustrates a DSL/analog splitterless environment.

To allow a single-jack modem to simultaneously connect to an analog phone outlet and a digital phone outlet, a dongle 100 is provided as shown in FIG. 1. Dongle 100 includes three jacks: a combo jack 101, a DSL jack 102, and an analog jack 103. All three of these jacks are of the RJ-11 standard in the exemplary embodiment. Combo jack 101 includes four connection terminals (a), (b), (c), and (d), where terminals (a) and (d) are commonly referred to as outer twisted pair terminals, and where terminals (b) and (c) are commonly referred to as inner twisted pair terminals. Combo jack 101 connects on one side internally to digital jack 102 and analog jack 103, and on the other side externally to a combo modem, such as DSL/analog combo modems 403 or 503 (shown in FIGS. 4 and 5, respectively).

Digital jack 102 includes on one side an inner pair of terminals (e) and (f) that are internally connected in dongle 100 to the outer pair (a) and (d), respectively, of combo jack 101. The connection lines in FIG. 1 between terminals (e) and (f) and outer pair (a) and (d) represent a means for routing DSL signals from DSL jack 102 to combo jack 101. Alternatively, to support additional wiring, DSL jack 102 may also include an outer pair of terminals, not shown in the figure. The external side of DSL jack 102 is connected to an outlet or jack that provides either DSL data alone, or both analog and DSL data on the same line (i.e., a splitterless environment).

Analog jack 103 includes an inner pair of terminals (g) and (h) that are internally connected in dongle 100 to the inner pair (b) and (c), respectively, of combo jack 101. The connection lines in FIG. 1 between terminals (g) and (h) and inner pair (b) and (c) represent a means for routing analog signals from analog jack 103 to combo jack 101. The external side of analog jack 103 is connected to an outlet or jack that provides analog data alone (e.g., telephone voice data).

Also included in dongle 100 are filter 104 and switch 105, where filter 104 represents a means for separating mixed signals and may be a DSL microfilter as described above. Switch 105 is operable to switch between an OFF and ON position, with filter 104 correspondingly and respectively switching OFF and ON. Filter 104 is not used while in an OFF position, but acts to separate DSL and analog signals in an ON position. One method for filter 104 to perform this function is to act as a low-pass filter, such as a DSL microfilter, where data frequencies above around 3400 Hz (e.g., digital DSL signals) are blocked.

In a spluttered environment, switch 105 is turned OFF, which sets filter 104 in an OFF position. In this situation, a DSL-only line is connected to DSL jack 102 and an analog line is connected to analog jack 103. DSL signals received at DSL jack 102 are kept separate from analog signals received at analog jack 103 as they are routed to the respective outer and inner pair terminals of combo jack 101. From combo jack 101, a combo modem receives both the DSL and analog signals.

Figure 4:
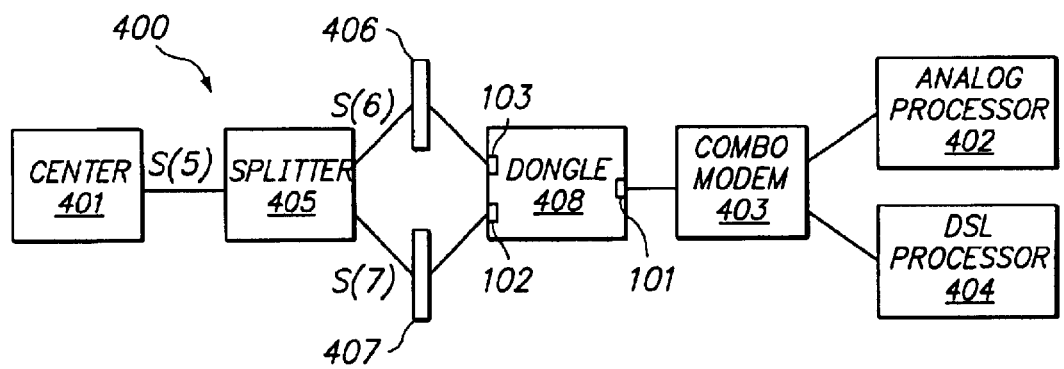
FIG. 4 illustrates the use of a dongle in a splittered environment in accordance with an embodiment of the present invention.

FIG. 4 illustrates the use of a dongle 408 in a splittered environment, where splitter 405 receives mixed-signal S(5) from center 401 and splits the signal Into analog signal S(6) and DSL signal S(7). The two split signals S(6) and S(7) are respectively transmitted through wall jacks 406 and 407 to dongle 408, where they are received by the dongle's corresponding analog 103 and DSL 102 jacks and internally routed to the four terminals of its combo jack 101. In this splittered environment, the filter (not shown) of dongle 408 is switched OFF and is effectively by-passed. From there, the signals are transmitted through a single two-pair line to single-jack combo modem 403, where the analog data may be separated from the DSL data and transmitted to an analog device such as analog processor 402. Digital data, on the other hand, is transmitted to processor 404, which may be a personal computer, for processing.

In a splitterless environment, switch 105 is turned ON and filter 104 acts to separate analog signals from DSL signals. In this situation, a line carrying both DSL and analog frequencies is connected to DSL jack 102. Analog jack 103 is not used. Switch 105, filter 104, the lines connecting DSL jack 102 to filter 104, and the lines connecting filter 104 to terminals (a), (b), (c), and (d) of combo jack 101 represent a means for routing signals of a mixed type (i.e., both DSL and analog frequencies) to filter 104, and for routing separated signals to the terminals of combo jack 101. Filter 104 operates (e.g., as a low-pass filter) to separate the DSL and analog signals on the shared pair (i.e., from inner pair (e) and (f) terminals), and separated DSL signals are sent to the outer pair (a) and (d) of combo jack 101, while separated analog signals are sent to the inner pair (b) and (c). From combo jack 101, a combo modem receives both the DSL and analog signals.

Figure 5:
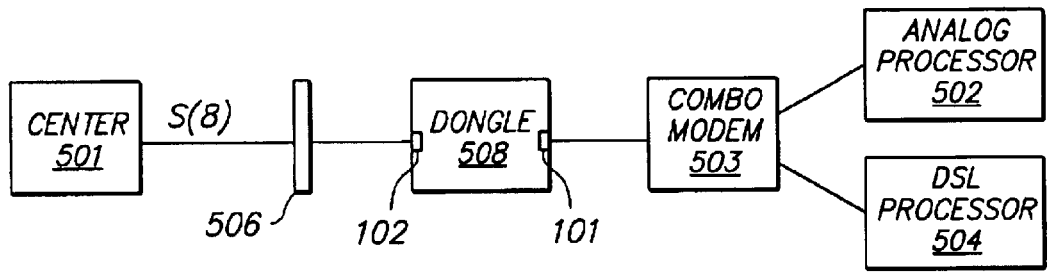
FIG. 5 illustrates the use of a dongle in a splitterless environment in accordance with an embodiment of the present invention.

FIG. 5 illustrates the use of a dongle 508 in a splitterless environment, where dongle 508 receives mixed-signal S(8) from center 501 through wall jack 506. Dongle 508 receives the signal at the inner pair (e) and (f) of DSL jack 102 and, with the use of the switch and filter as described above, separates the signal into an analog signal and a DSL signal. The two split signals are then internally routed to the four terminals of combo jack 101. From there, the signals are transmitted through a single two-pair line to single-jack combo modem 503, where the analog data may be separated from the DSL data and transmitted to an analog device such as analog processor 502. DSL data, on the other hand, is transmitted to DSL processor 504, which may be a personal computer, for processing.

In this way, a DSL/analog combo modem with only one RJ-11 jack can be used in both a splittered environment, where the modem is simultaneously connected with an analog line and a DSL line, and a splitterless environment, where the modem only needs to be connected to one line carrying both DSL and analog signals on a shared pair. The use of a device such as dongle 100 avoids the swapping of cables or lines that necessarily results when a single-jack combo modem is used in a spluttered environment.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A dongle for interfacing a Digital Subscriber Line (DSL)/Analog combo modem with each of a DSL line and an analog phone line, the dongle adapted to operate in one of a first state and a second state corresponding respectively to a splittered environment and a splitterless environment and comprising:

a combo jack having a first pair of terminals and a second pair of terminals;

a DSL jack; and an analog jack, wherein the combo jack is coupled to the DSL jack and the analog jack simultaneously, and wherein the combo jack receives DSL signals at one of the first and second pairs of terminals, and analog signals at the other of the first and second pairs of terminals.

2. The dongle of claim 1, further comprising a microfilter and a switch, wherein the switch selectively turns the microfilter on or off for operation in the second and first states, respectively.

3. The dongle of claim 2, wherein DSL signals are transmitted from the DSL jack to one of the first and second pairs of terminals of the combo jack, and analog signals are transmitted from the analog jack to the other of the first and second pairs of terminals of the combo jack, when the microfilter is turned off.

4. The dongle of claim 2, wherein DSL signals and analog signals are transmitted as mixed signals from the DSL jack when the microfilter is turned on.

5. The dongle of claim 4, wherein the microfilter, when on, separates the mixed signals into DSL signals and analog signals such that the DSL signals are transmitted to one of the first and second pairs of terminals of the combo jack and the analog signals are transmitted to the other of the first and second pairs of terminals of the combo jack.

6. The dongle of claim 4, wherein the combo jack, the DSL jack, and the analog jack are each RJ-11 jacks, and wherein the first and second pairs of terminals are respectively inner and outer pairs of terminals.

7. The dongle of claim 2, wherein the microfilter is operable as a low-pass filter.

8. A dongle for interfacing a Digital Subscriber Line (DSL)/Analog combo modem with each of a DSL line and an analog phone line, the dongle comprising:

first, second and third jacks;

means for separating combined Analog and DSL signals of a mixed type into signals of a first type and signals of a second type, respectively;

means for routing signals of a first type from the first jack to a first pair of terminals of the third jack;

means for routing signals of a second type from the second jack to a second pair of terminals of the third jack; and means for routing signals of a mixed type from the second jack to the means for separating.

9. The dongle of claim 8, wherein the means for routing signals of a mixed type routes signals of a first type and signals of a second type from the means for separating to the first pair of terminals and the second pair of terminals of the third jack, respectively.

10. The dongle of claim 8, wherein the means for separating signals is a microfilter.

11. The dongle of claim 8, wherein the first, second, and third jacks are RJ-11 jacks.

12. The dongle of claim 8, wherein the dongle is selectively operable in one of splittered and splitterless environments.

13. The dongle of claim 8, wherein the signals of a mixed type include both analog and DSL signals.

* * * * *